United States Patent [19]

Kravitz

[11] Patent Number: 4,961,044
[45] Date of Patent: Oct. 2, 1990

[54] POWER FACTOR CORRECTION CIRCUIT FOR POWER SUPPLIES

[76] Inventor: Melvin Kravitz, 6 Seaside Dr., Port Jefferson, N.Y. 11777

[21] Appl. No.: 401,805

[22] Filed: Sep. 1, 1989

[51] Int. Cl.$^5$ .............................................. G05F 3/06
[52] U.S. Cl. .................................. 323/205; 323/208; 363/44
[58] Field of Search ...................... 323/205, 206, 208; 363/39, 44

[56] References Cited

U.S. PATENT DOCUMENTS

| | | | |
|---|---|---|---|
| 2,367,625 | 1/1945 | Short | 323/205 |
| 4,119,907 | 10/1978 | Quinn | 323/208 |
| 4,212,053 | 7/1980 | Sichenzia | 363/39 |
| 4,222,096 | 9/1980 | Capewell | 363/44 |
| 4,369,490 | 1/1983 | Blum | 323/208 |
| 4,672,522 | 6/1987 | Lesea | 323/208 |
| 4,795,959 | 1/1989 | Cooper | 363/39 |
| 4,930,061 | 5/1990 | Slack et al. | 363/44 |

Primary Examiner—Steven L. Stephan
Assistant Examiner—Jeffrey Sterrett

[57] ABSTRACT

A power factor correction circuit for an AC to low voltage DC power supply designed to be connected to a source of AC power includes a linear transformer having primary and secondary windings, and a capacitor. In use, the primary winding is electrically connected in series with and between the AC power source and the power supply, and the capacitor is electrically connected in series with the secondary winding across the power supply, between the primary winding and the power supply. The inductance value of the primary winding is selected to remove odd harmonics from the line current drawn by the load represented by the power supply on the AC power source, and the capacitance value of the capacitor is selected to provide the reactive power load demand of the power supply. The turns ratio between the secondary winding and the primary winding of the transformer is selected to eliminate the loss of power supply operating line range caused by the voltage drop across the primary winding. The voltage regulation by the power supply is achieved with improved power factor and reduced radio frequency interference.

4 Claims, 1 Drawing Sheet

POWER FACTOR CORRECTION CIRCUIT FOR POWER SUPPLIES

BACKGROUND OF THE INVENTION

Switching regulated power supplies operate off AC line voltage to convert the unregulated high voltage to regulated low voltage. In one common application, such power supplies are used to convert high AC line voltages to regulated low DC voltage, such as 5 volt, 12 volt, and 24 volt DC supply voltages employed for semiconductor integrated circuits in personal computer terminals. As shown in FIG. 1 of the accompanying drawings, the AC line voltage is full wave rectified to provide a high voltage unregulated DC bus voltage. This voltage is applied via a capacitor filter to a high frequency (typically, 20 to 500 kHz) DC to DC inverter circuit which performs pulse width modulation for output voltage control. Transformers are employed in the power supply to provide isolation between input and output and for voltage scaling.

The series of voltage pulses at the transformer secondary is applied to an output low pass filter circuit to provide an output voltage which is the average value of the input voltage, as follows:

Output voltage = $(t_{on}/T)(N_2/N_1)E_{DC}$ where $t_{on}$ is pulse width; T is pulse cycle time; $N_1$ and $N_2$ are the number of windings on the primary and secondary, respectively, of the transformer; and $E_{DC}$ is the DC level of the AC input voltage to the power supply.

The output voltage of the supply is employed as the supply voltage for the semiconductor devices of the computer. The power supply efficiency is the ratio of power out to power in, and can be high—for example, greater than 70% for 5 volt outputs and greater than 85% for 24 volt outputs. The power factor, which is a measure of how well such a power supply utilizes the AC line voltage, however, is typically relatively low. A power factor of 0.7 is not unusual for supplies above 500 watts. Low power factor is attributable to the fact that the input current drawn by the rectifier and filter capacitor of the power supply is not sinusoidal and is not in phase with the input voltage.

As shown in FIG. 2A, superimposing current drawn by the supply on the line voltage, the current is drawn only in periodic pulses to recharge the input capacitor. A power factor improvement can be realized by increasing the conduction angle $\phi$, but this capability is limited by the ripple current rating of the input filter capacitor. For a typical conventional power supply with a $\phi$ of $\frac{1}{4}$ of T/2 seconds, the demand is four times the RMS value of the input current.

As shown in FIG. 2B, voltage loss occurs as a result of high peak demand at the wall outlet for the power supply. The large peak current loading produces stress on facility wiring, and results in loss of peak AC voltage because of reactive and resistive regulation losses. It is not unusual to suffer as much as a 10% loss of peak AC voltage in a typical installation, with a concomitant deterioration of performance of other AC loads in use in the same facility.

A power supply having a power factor of 0.75 draws 25% more input current than a comparable power supply having a unity power factor. For example, a conventional 1000 watt, 5 volt power supply operating with a 0.75 power factor off a 115 volt AC input line will draw 16 amps, which exceeds the Underwriter Laboratories, Inc. limit of 15 amps per power outlet. In contrast, an otherwise identical power supply having a power factor of unity would draw only 12 amps under the same operating conditions, and would allow the AC voltage to remain sinusoidal rather than flattened because of supply loading as shown in FIG. 2B. The susceptibility of other loads to deterioration of performance is also reduced in the presence of a power supply operating with the higher power factor, at least partly because harmonic current is substantially reduced or virtually eliminated.

It is a principal object of the present invention to provide an improved power supply with high efficiency of power conversion.

It is another object of the invention to provide a regulated AC to DC converter having unity or near-unity power factor and relatively low input current demand.

Still another object is to provide a power supply which achieves high power conversion efficiency without adversely affecting the operating line range.

A more specific object of the present invention is to provide a powersaver circuit for use with or addition to a regulated AC to DC power supply, to improve the power factor, conversion efficiency, and operating line range impact of the supply.

Prior art correction circuits are typified by the disclosures in U.S. Pat. Nos. 2,367,625 to Short; 4,119,907 to Quinn; and 4,369,490 to Blum. Short describes a voltage regulator circuit including a capacitor, a linear reactor in series and a non-linear reactor in parallel with the capacitor, the volt-ampere characteristics of the reactors and the capacitor intersecting at a resonance point. Such a circuit provides voltage regulation but without improving the power factor. Blum discloses a low-ripple power rectifier system which includes a choke inductance and a capacitor, such a system being capable of power factor improvement but at the expense of reduced operating line range. Quinn describes a power factor corrector circuit having a filter which includes a fixed inductor and a capacitor, for a resistive load. The latter circuit also suffers from substantially reduced operating line range.

SUMMARY OF THE INVENTION

Briefly, according to a presently preferred embodiment of the present invention the powersaver or power factor correction circuit includes a linear current transformer and capacitor, the latter being electrically connected in series with the secondary winding of the former across the power supply load, and the large inductance of the primary winding being in series electrically with the power supply load.

The inductance of the primary winding of the current transformer is adjusted to provide attenuation of the harmonic current that normally flows from the AC power line because of the rectifier and capacitor DC filter in the power supply load. The value of this inductance is selected or adjusted to reduce the odd harmonics of the line current to less than five percent of their uncorrected value, for an AC power line frequency of 50 or 60 Hz. This serves to produce an almost sinusoidal input current, in contrast to a relatively distorted waveform containing odd harmonics.

The capacitor of the powersaver circuit is selected to have a value which provides the capacitive reactive volt amperes demanded by the power supply load, and virtually continuous supply current demand. The secondary winding of the current transformer serves to develop a voltage intended to correct the power supply input voltage attributable to increasing load placed on the power supply, and thereby to avoid reduction of the operating line range of the supply.

In essence, the powersaver circuit exploits the constant efficiency characteristics of the switching regulator power supply load. The product of line current and line voltage is constant, and consequently the input current is greatest at low line voltage. At the same time the voltage drop across the primary winding of the current transformer is at a maximum. Nevertheless, the presence of the secondary winding assures that less than 1% of the line range is sacrificed, to produce a power factor of 0.95 or better. Also, the reduction of harmonics in the line current, attributable to the primary winding, tends to preclude radio frequency interference from operation of the power supply.

It is, therefore, another object of the present invention to provide a power factor correction circuit for suitable correction of AC power sources which provide line input to switching regulator or electronic low voltage power supplies.

A further object of the invention is to provide a power factor correction circuit comprising a linear current transformer and a capacitance to be disposed in circuit between the AC power line and the input of a power supply converter for low voltage electronic or semiconductor supply functions, to improve the input waveform, reduce harmonics, and to enhance the demand presented by the power supply load.

SUMMARY OF THE DRAWINGS

The above and still further objects, features and attendant advantages of the present invention will become apparent from the following detailed description of the presently preferred embodiment of the invention, taken in conjunction with the accompanying drawings, in which.

DETAILED DESCRIPTION OF THE PREFERRED EMBODIMENT

Figure 1:
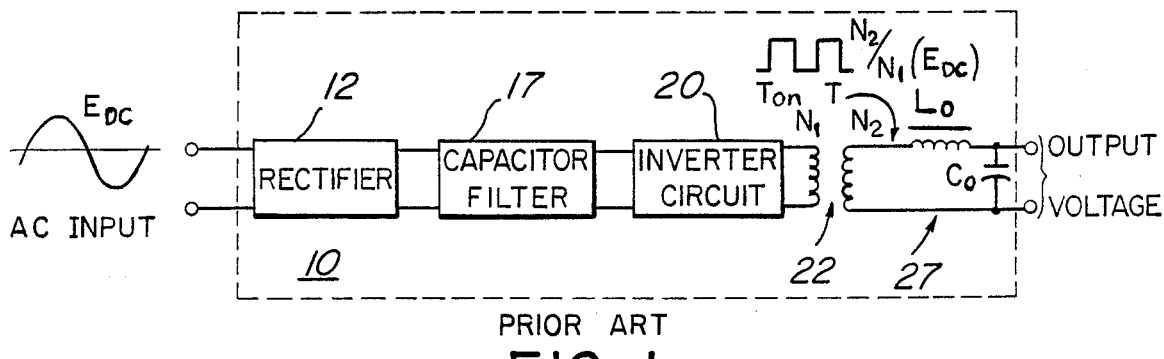
FIG. 1 is a schematic diagram of a prior art switching regulator power supply which converts unregulated AC high voltage from an AC power line to regulated DC low voltage for powering semiconductor circuitry in electronic equipment such as computer terminals.

Referring again to the prior art switching regulator power supply shown in FIG. 1, the supply includes a full wave rectifier 12 adapted to receive an AC input having a DC voltage level (waveform 15) from a commercial power line such as the 110-125 volt 50-60 HZ output available from a wall outlet connected to the line. The rectifier 12 is connected to a capacitor filter or choke filter 17 which, in turn, is coupled to a DC to DC inverter circuit 20. The inverter 20 supplies a transformer 22 having a primary winding N1 and a secondary winding N2. The electrical output waveform at the secondary of the transformer 22 is shown at 25. Waveform 25 is applied to a low pass filter constituting the output circuit 27 of power supply 10, comprising inductance $L_o$ and output capacitance $C_o$.

The AC line voltage with DC component consituting waveform 15 is full wave rectified by rectifier 12, resulting in a high voltage unregulated DC bus voltage at the output of the rectifier. The rectifier output voltage is filtered by capacitor filter 17 and the filtered voltage is applied to the inverter circuit 20. The latter is a DC to DC inverter which is responsive to frequencies in the range from, say, 20 to 500 kHz, and provides pulse width modulation for output voltage control. The output transformer 22 isolates the input and output circuits of power supply 10 and provides voltage scaling, and the output at the secondary of the transformer is the series of voltage pulses of waveform 25.

The amplitude of each pulse in the train of waveform 25 is the product of (i) the ratio of the secondary and primary windings of transformer 22 and (ii) the DC component $E_{DC}$ of the input waveform 15 from the AC power line. The output voltage of the low pass filter circuit 27 (and, thus, of power supply 10) is the average value of the input voltage to that circuit, which is the ratio of the width of each pulse ($t_{on}$) to a full cycle (T) of the train multipled by the pulse amplitude, or mathematically:

Output voltage = $(t_{on}/T)$ $(N_2/N_1)$ $E_{DC}$.

This output voltage from power supply 10 is a suitable low voltage supply for any of a number of electronic equipment applications, such as computer systems, medical instrumentation, telephone switching systems, machine control systems, or other apparatus employing semiconductor devices or integrated circuitry that requires relatively low supply voltages.

Figure 2A:
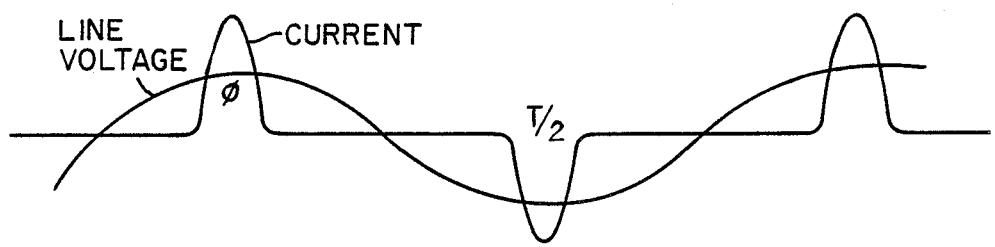
FIG. 2A is a waveform in which current drawn by the power supply of FIG. 1 is superimposed on the line voltage.
Figure 2B:
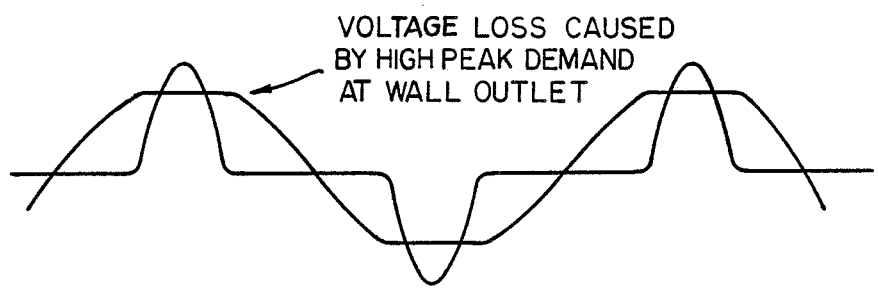
FIG. 2B is a waveform illustrating the voltage loss which occurs as a result of high peak demand at the AC wall outlet for the power supply.

By way of example, the typical efficiency of such prior art power supplies may exceed 70% for 5 volt outputs and 85% for 24 volt outputs, but with relatively low power factors for reasons discussed in the Background section hereof with reference to FIGS. 2A and 2B. The present invention provides rather simple, low cost circuitry for enhancing the power factor of such switching regulator or electronic low voltage power supplies.

In particular, power factor improvement ranging from 20% to 30% has been achieved using the presently preferred embodiment of the invention, which comprises a linear current transformer and a capacitor, at the front end input section of the power supply for direct connection to the AC power line. These improvements are achieved at least in part by the effect of this circuit to enhance the input waveform to the power supply, reduce harmonics attributable to other circuitry within the power supply, and enhance the load demand.

Figure 3:
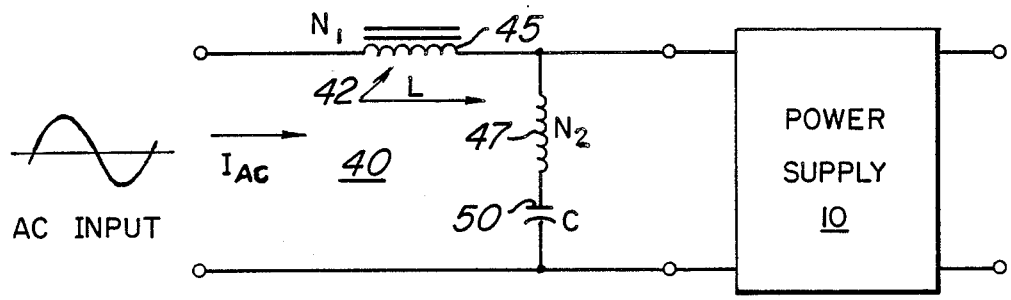
FIG. 3 is a schematic diagram of the preferred embodiment of the powersaver or power factor correction circuit of the present invention.

Referring to FIG. 3, the preferred embodiment of the power factor correction circuit 40 includes a linear current transformer 42 having primary winding 45 with a number of turns $N_1$ and an inductance L, and a secondary winding 47 with a number of turns $N_2$. A capacitor 50 is electrically connected in series with secondary winding 47 across the load (power supply 10) presented to the power factor correction circuit. The primary winding 45 is connected in series with the load. Inductance L of primary winding 45 has a value selected to attenuate the odd harmonics that otherwise distort the current $I_{AC}$ from the AC power line (the power line output being illustrated in FIG. 3 as waveform 15). The harmonics are attributable principally to the rectifier 12 and the capacitor filter 17 of the power supply 10. I have found that by proper selection of the value of inductance L the odd harmonic currents may be reduced to less than approximately five percent of their uncorrected value, at an AC power line frequency ranging from 50 to 60 Hz. The result is an input current to the power supply 10 having a virtually distortion-free sinusoidal characteristic.

Capacitor 50 of power factor correction circuit 40 is selected to have a value suitable to provide the reactive power (volt amperes) demanded by the load presented by power supply 10. Primary winding 45 has a voltage drop $V_1$ which is proportional to its inductance value L, and the line frequency $f$ and line current $I_{AC}$ (i.e., the demand current of the load represented by the power supply 10). Specifically, $$V_1 = (2\pi f L) I_{AC}.$$

Secondary winding 47 also develops a voltage $V_2$ proportional to the AC line current, and corrects the power supply input voltage caused by an increasing load placed on the supply. In particular, $$V_2 (N_2/N_1) (2\pi f L) I_{AC}$$

The product of line current and line voltage is constant, the input current having the highest magnitude at low line voltage, and the voltage loss $V_1$ concurrently being at a maximum. Without secondary winding 47, the power supply operating line range consequently would be reduced by about 10% in those circumstances. The use of the secondary winding, however, virtually eliminates the effect of the large voltage drop across the large inductance of the primary winding, such that less than 1% of the operating line range of the power supply is sacrificed. The result is that power supply 10 achieves a power factor of 0.95 or better, with considerably reduced radio frequency interference from virtual elimination or considerable lowering of the odd harmonics in the line current.

By selecting the number of turns $N_2$ on secondary winding 47 to be 30% of the number of turns $N_1$ % on primary winding 45 of the linear current transformer 42, total line regulation correction of power supply operation may be achieved over the full supply operating range. Noteworthy results were achieved using a power factor correction circuit according to the present invention with a Switching Power, Inc. Model HSQ switching regulator power supply. The latter supply is rated 5 volts/150 amps and 12 volts/22 amps at a 1000 watt load. Without the power factor correction circuit, the following results were obtained from operation of the power supply at 1000 watts of load.

| AC Line Voltage | AC Current | Power Factor |
| --- | --- | --- |
| 90 | 19.25 | 0.813 |
| 102 | 17.46 | 0.791 |
| 115 | 15.84 | 0.771 |
| 125 | 14.82 | 0.755 |
| 132 | 14.19 | 0.745 |

Under the same conditions, except with the power factor correction circuit of FIG. 3 placed in circuit between the AC power source and the power supply, with inductance L of primary winding 45 having a value of 10 mh (linear, non-saturating at a line current of 20 amps RMS), $N_2$ at 30% of $N_1$, and capacitor 50 having a value of 50 uf, the following results were achieved.

| AC Line Voltage | AC Current | Power Factor |
| --- | --- | --- |
| 90 | 15.71 | 0.984 |
| 102 | 14.28 | 0.983 |
| 115 | 12.76 | 0.963 |
| 125 | 11.92 | 0.952 |
| 132 | 11.52 | 0.950 |

It may thus be seen that the present invention, when compared with the prior art, provides vastly improved power factors for switching regulator and electronic low voltage power supplies, with full voltage regulation over the entire operating line range and without any reduction of line range, while providing harmonic reduction that results in the overall system of power supply and power factor correction circuit well within International IEC radio frequency interference limits.

In the schematic diagram of FIG. 3, the power factor correction circuit 40 is shown as being separate from the power supply 10, i.e., capable of being separately packaged and sold. In practice, however, it would be desirable to make the power factor correction circuit a part of the power supply circuit housed within the mechanical enclosure for the power supply.

Although a presently preferred embodiment of the invention has been disclosed herein, it will be apparent to those skilled in the art to which the present invention pertains that variations and modifications of the described illustrative embodiment may be made without departing from the true spirit and scope of the invention. It is therefore intended that the invention shall be limited only by the appended claims and the rules and principles of applicable law.

What is claimed is:

1. A power factor correction circuit for an AC to low voltage DC power supply designed to be connected to a source of AC power, said circuit comprising a linear transformer having primary and secondary windings, said primary winding being arranged and adapted to be connected electrically in series with and between said source and said power supply, said primary winding having an inductance value selected to reduce odd harmonics from the line current drawn by said power supply as a load on said source of AC power, and a capacitor electrically connected in series with said secondary winding, the series connection of said capacitor and said secondary winding being arranged and adapted to be connected electrically in parallel with said power supply, between said primary winding and said power supply, said capacitor having a capacitance value selected to provide the reactive power demand of said power supply as a load on said source of AC power, and said secondary winding having a turns ratio relative to said primary winding selected to eliminate the loss of power supply operating line range caused by the voltage drop across said primary winding when said power factor correction circuit is electrically connected between said source of AC power and said power supply load, whereby to provide voltage regulation by said power supply proportional to substantially undistorted line input current from said source of AC power, with improved power factor, while overcoming the AC voltage drop across said primary winding that would otherwise reduce the operating line range of said power supply.

2. The invention according to claim 1, wherein said power supply has an input circuit which includes a rectifier a and capacitor filter.

3. The invention according to claim 1, wherein said power supply includes an enclosure for housing all of the components thereof, and said power factor correction circuit is housed within said enclosure.

4. The invention according to claim 2, wherein said turns ratio of said secondary winding to said primary winding is approximately 1:3.

* * * * *